(12) United States Patent
Keen

(10) Patent No.: US 9,233,434 B2
(45) Date of Patent: Jan. 12, 2016

(54) METHOD OF AND MATERIAL PROCESSING APPARATUS FOR OPTIMISING THE FOCUS OF A FIBRE LASER; METHOD OF MEASURING CHANGES IN THE FOCUS OF A FIBRE LASER

(75) Inventor: Stephen Keen, Warwickshire (GB)

(73) Assignee: SPI LASERS UK LIMITED, Southampton (GB)

( * ) Notice: Subject to any disclaimer, the term of this patent is extended or adjusted under 35 U.S.C. 154(b) by 61 days.

(21) Appl. No.: 13/813,926

(22) PCT Filed: Jul. 19, 2011

(86) PCT No.: PCT/GB2011/051359
§ 371 (c)(1),
(2), (4) Date: Apr. 12, 2013

(87) PCT Pub. No.: WO2012/022951
PCT Pub. Date: Feb. 23, 2012

(65) Prior Publication Data
US 2013/0188178 A1    Jul. 25, 2013

(30) Foreign Application Priority Data

Aug. 16, 2010 (GB) .................................. 1013700.8
Mar. 15, 2011 (GB) .................................. 1104350.2

(51) Int. Cl.
| | |
|---|---|
| *B23K 26/03* | (2006.01) |
| *B23K 26/00* | (2014.01) |
| *B23K 26/04* | (2014.01) |

(Continued)

(52) U.S. Cl.
CPC .............. *B23K 26/03* (2013.01); *B23K 26/0006* (2013.01); *B23K 26/0066* (2013.01); *B23K 26/032* (2013.01); *B23K 26/048* (2013.01); *B23K 26/0622* (2015.10); *B23K 26/0665* (2013.01); *B23K 26/20* (2013.01); *B23K 26/38* (2013.01); *B23K 2203/50* (2015.10)

(58) Field of Classification Search
USPC .............. 356/122, 73.1, 5.09, 5.1, 5.14, 4.07; 250/559.13, 201.4, 227.14, 227.17, 250/227.18; 272/6
See application file for complete search history.

(56) References Cited

U.S. PATENT DOCUMENTS 4,777,341 A * 10/1988 Steen et al. ............... 219/121.83
4,952,816 A *  8/1990 Dunning .................. 250/559.31

(Continued)

FOREIGN PATENT DOCUMENTS

| | | |
|---|---|---|
| DE | 10329744 A1 | 9/2004 |
| DE | 102008010981 A1 | 8/2009 |

(Continued)

OTHER PUBLICATIONS

International Search Report for International Application No. PCT/GB2011/051359, dated Oct. 19, 2011.

*Primary Examiner* — Sang Nguyen
(74) *Attorney, Agent, or Firm* — Locke Lord LLP; Christopher J. Capelli; Alexander Viderman

(57) ABSTRACT

A method of optimizing the focus of a fibers laser is described, which comprises positioning the output of a fibers laser relative to a workpiece; measuring at least a portion of back reflected radiation from the workpiece (step 52); determining an integral of this; changing the relative position of the output and the workpiece one or more times (step 54,56), each time determining an integral of values for the back-reflection, and using the integrals to determine optimum focus.

16 Claims, 7 Drawing Sheets

(51) Int. Cl.
*B23K 26/06* (2014.01)
*B23K 26/20* (2014.01)
*B23K 26/38* (2014.01)

(56) References Cited

U.S. PATENT DOCUMENTS

| | | | |
|---|---|---|---|
| 5,200,838 A * | 4/1993 | Nudelman et al. | 358/443 |
| 5,219,345 A * | 6/1993 | Potter | 606/15 |
| 5,887,009 A * | 3/1999 | Mandella et al. | 372/6 |
| 5,912,257 A * | 6/1999 | Prasad et al. | 514/356 |
| 8,107,056 B1 * | 1/2012 | Riza | 356/4.05 |
| 8,838,213 B2 * | 9/2014 | Tearney et al. | 600/478 |
| 2007/0045574 A1 * | 3/2007 | Bruland | 250/559.13 |
| 2007/0230517 A1 * | 10/2007 | Matsuda et al. | 372/6 |
| 2009/0175301 A1 * | 7/2009 | Li et al. | 372/6 |
| 2011/0007304 A1 | 1/2011 | Geisel | |
| 2011/0180521 A1 * | 7/2011 | Quitter et al. | 219/121.73 |
| 2012/0188365 A1 * | 7/2012 | Stork | 348/90 |
| 2012/0241427 A1 * | 9/2012 | Maltsev et al. | 219/121.85 |

FOREIGN PATENT DOCUMENTS

| | | | |
|---|---|---|---|
| GB | 2458304 A * | 9/2009 | |
| JP | 2259711 | 10/1990 | |
| JP | 2007083285 A | 4/2007 | |
| WO | WO-2009112815 A1 | 9/2009 | |
| WO | WO 2009112815 A1 * | 9/2009 | |

* cited by examiner

_US 9,233,434 B2_

METHOD OF AND MATERIAL PROCESSING APPARATUS FOR OPTIMISING THE FOCUS OF A FIBRE LASER; METHOD OF MEASURING CHANGES IN THE FOCUS OF A FIBRE LASER

CROSS-REFERENCE TO RELATED APPLICATIONS

This application is a U.S. National Stage Application under 35 U.S.C. §371 based on International Application No. PCT/GB2011/051359, filed Jul. 19, 2011, which claims the benefit of priority to Great Britain Patent Application No. GB1013700.8, filed Aug. 16, 2010, and Great Britain Patent Application No. GB1104350.2, filed Mar. 15, 2011.

FIELD OF THE INVENTION

This invention relates to optimising the focus of a fibre laser. In particular, but not exclusively, for a high brightness fibre laser, that is, a fibre laser of brightness greater than about $M^2<10$

BACKGROUND OF THE INVENTION

Critical to the performance and quality of material processing with a fibre laser is optimisation of the focus. A typical processing arrangement has a lens with variable focus position, a gas assist delivered via a nozzle and the workpiece itself usually mounted on some form of controllable translation stage. Before the advent of high powered continuous wave (cw) fibre lasers this form of processing would be typically carried out with a high powered solid state laser of 200 W to 4 kW. Lasers of this type would be relatively low brightness $M^2>10$ and be delivered in a large mode area multimode fibre, eg 400 μm 0.1 measured Numerical Aperture (NA) equivalent to an $M^2$ of 60. Typically used with one to one imaging a laser of this type would produce a focus of 400 μm with a confocal parameter (ie depth of field) of +/−2 mm. Comparing to a high brightness fibre laser source the working spot size is at least an order of magnitude larger than that of a fibre laser but the confocal parameter is about 20 times larger consequently focus is less critical. The parameter $M^2$ is defined further later on in this document.

Single mode fibre lasers are now capable of up to 10 KW in a single mode. The beam quality from a single mode fibre laser is a near perfect $M^2$ of 1 consequently the output of a fibre laser can be focussed to a much smaller spot than conventional solid state lasers. This decreased spot size, typically as small as 10 μm diameter, creates similar intensities as conventional lasers but at a much lower power. This enables processing of for like materials at much lower powers compared with conventional lasers. It is advantageous commercially to process with as low a power as possible as there is an approximate linear relationship between the price of a fibre laser and its power. Processing with this low power requires that the focus position relative to the workpiece and gas delivery nozzle is finely optimised. A beam with an $M^2$ of 1 and diameter 10 μm will have a confocal parameter of +/−75 μm illustrating the potential tolerance requirements of processing with a beam of this nature.

BRIEF SUMMARY OF THE INVENTION

The present invention arose in an attempt to provide an improved method of optimising the focus of a high brightness fibre laser.

According to the present invention in a first aspect, there is provided a method of optimising the focus of a fibre laser, comprising positioning the output of a fibre laser relative to a workpiece; measuring at least a portion of back reflected radiation from the workpiece; changing the relative position of the output and the workpiece one or more times and measuring at least a portion of back reflected radiation from the workpiece each time, and analysing the resulting measured back-reflected radiations to determine optimum focus.

Preferably, the method comprises determining an integral back-reflected radiation at each relative position and using the integrals to determine optimum focus.

In a preferred embodiment, the method comprises generating pulses and measuring the back-reflective radiation resulting from the pulse, and integrating each set of back-reflection results as the relative position of the workpiece and output is changed.

The method may be done using an apparatus as described in Patent Application No WO 2009/112815.

According to the present invention in a further aspect there is provided material processing system apparatus, comprising a fibre laser having an output which focuses a laser beam from the laser onto a workpiece, the output and workpiece being moveable relative to each other; means for monitoring at least part of the back reflection; means for analysing the back-reflection at each of a selection of relative positions of the output and workpiece and means for using the analysis to determine optimum focus.

Preferably, the apparatus comprises means for integrating the back reflection and each relative position for using the integrals to determine optimum focus.

Other methods of analysis may be used, such as determining the amplitude or maximum amplitude of back-reflected signals. This may be minimised to find the focus.

BRIEF DESCRIPTION OF THE SEVERAL VIEWS OF THE DRAWINGS(S)

Embodiments of the invention will now be described, by way of example only, with reference to the accompanying schematic drawings, in which:

FIG. 1(a) shows a cross-section through a delivery fibre;

Figure 5:
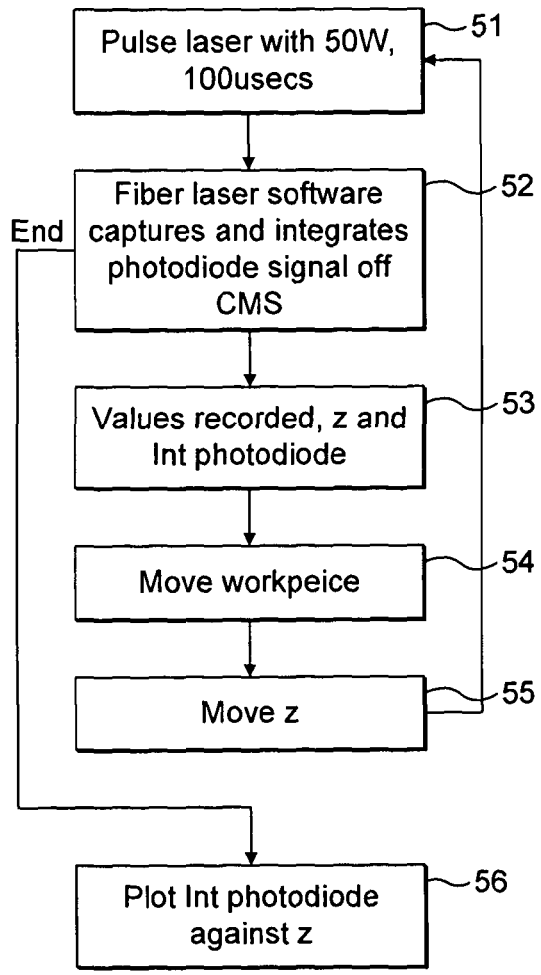
Figure 6:
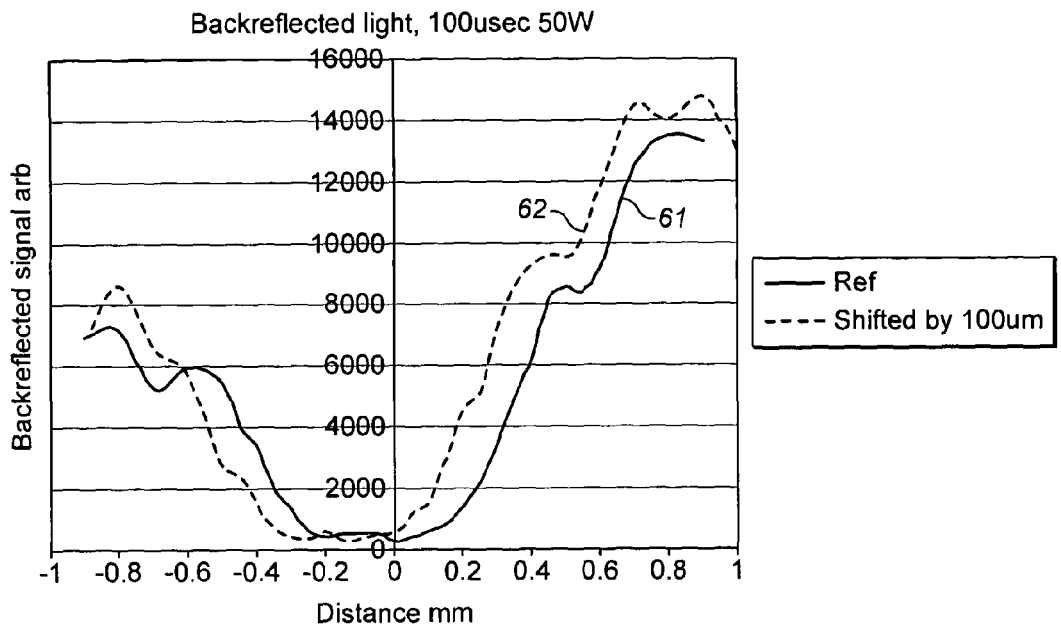
Figure 7:
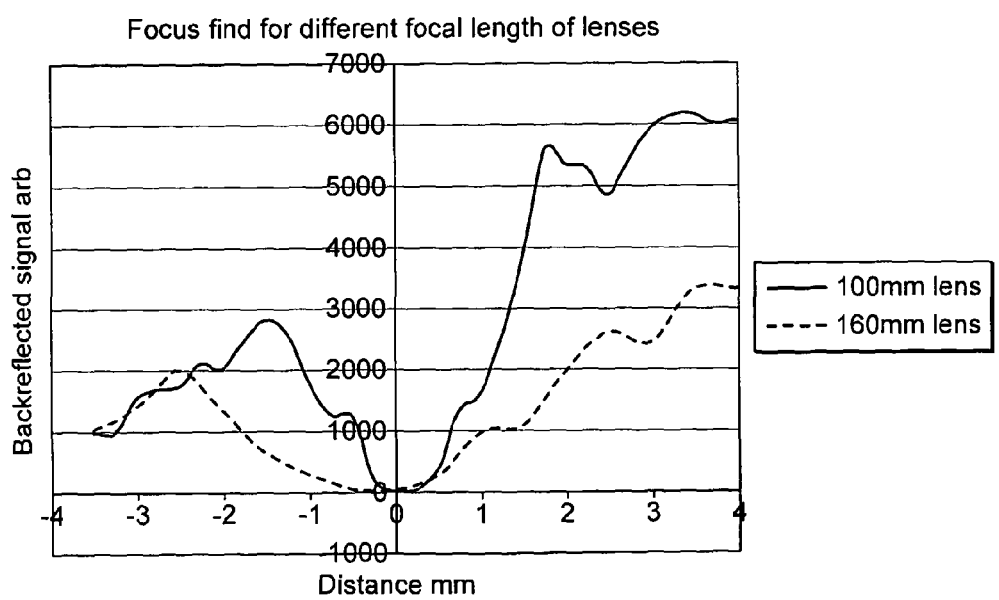
Figure 8:
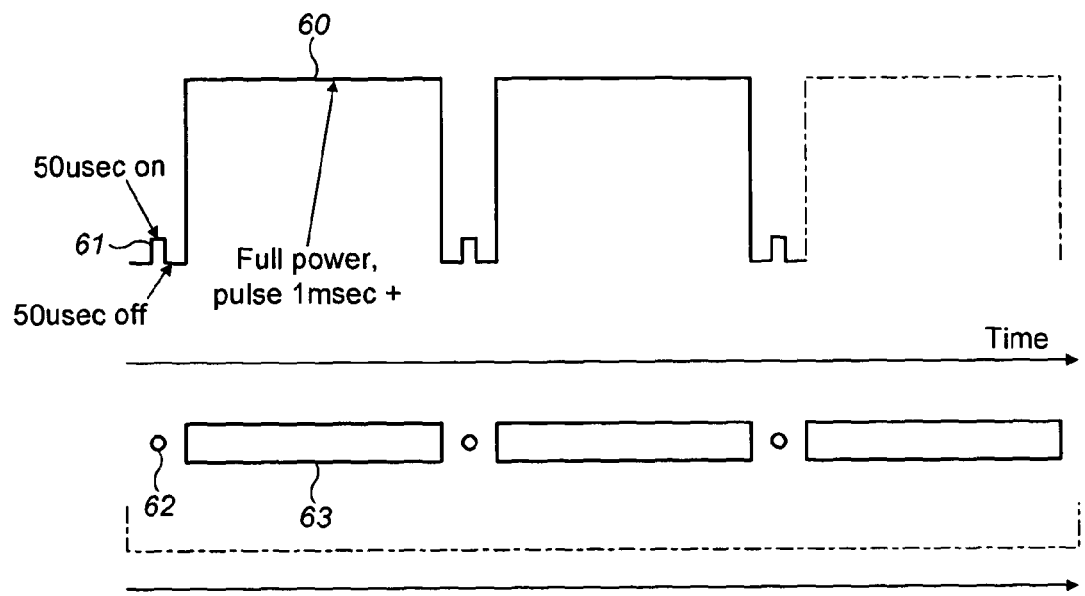
Figure 9:
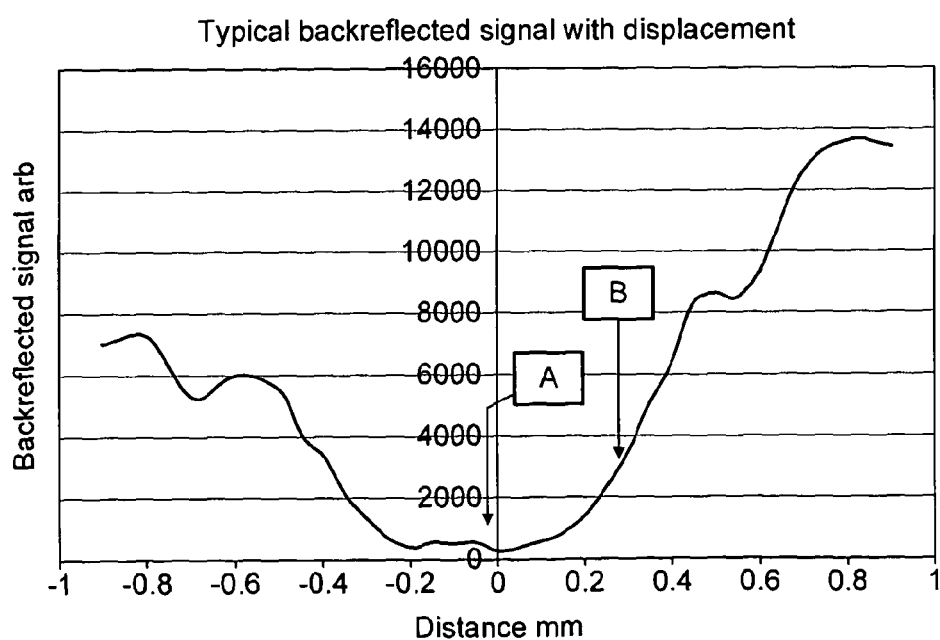
Figure 10:
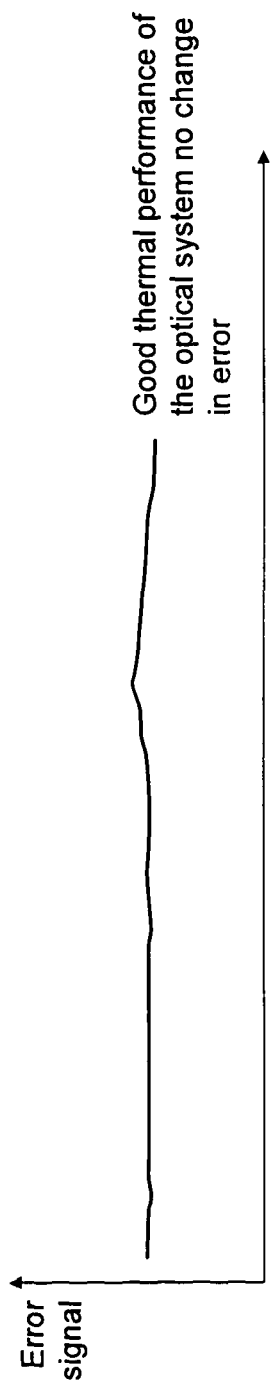

FIGS. 4(a) to 4(d) show respective plots of detected back-reflected infrared radiation from laser pulse as the relative position of a workpiece and laser output is changed;

FIG. 5 shows a method of optimising focus;

FIG. 6 shows two plots of results with a lens displaced by 100 μm between the plots;

FIG. 7 shows examples of use of the invention with different sizes of focus spot;

FIG. 8 shows an example of pulse regime for tracking a temporal change in focal position;

FIG. 9 shows a back reflected signal;

FIG. 10 shows an example of a relatively good optical performance; and

Figure 11:
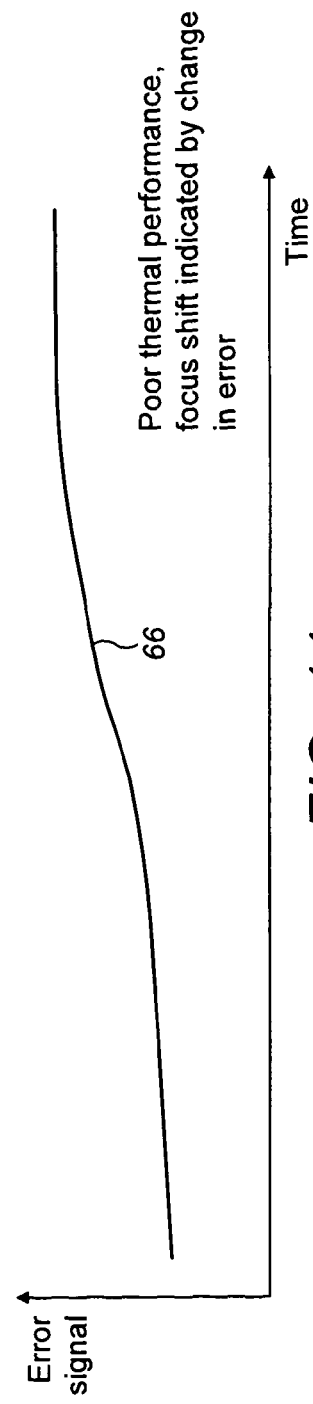

FIG. 11 shows an example of a relatively worse optical performance.

DETAILED DESCRIPTION OF THE INVENTION

Figure 1:
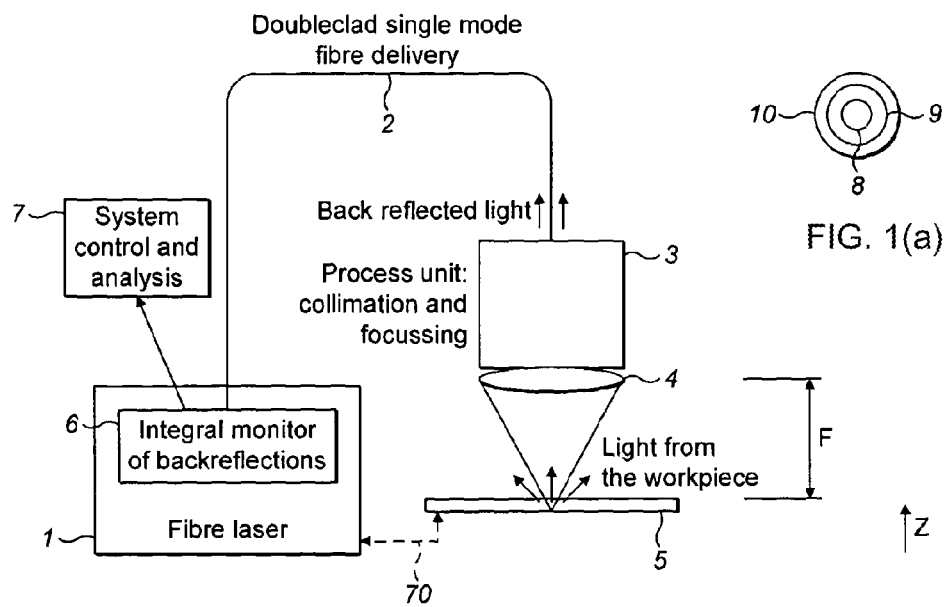
FIG. 1 shows a fibre laser system for processing a workpiece.
Figure 2:
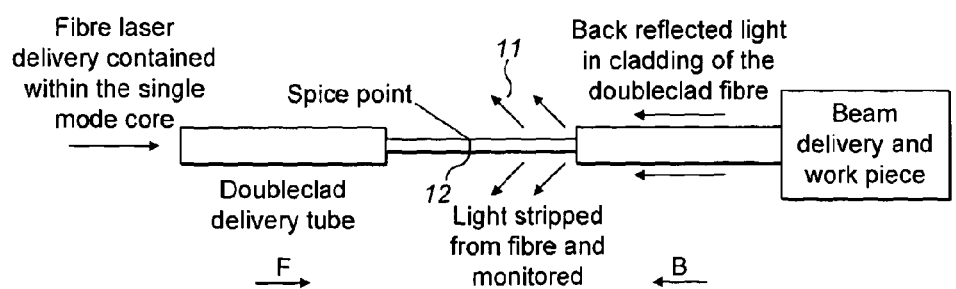
FIG. 2 shows part of a laser delivery system.

International Patent Application WO 2009/112815 describes an integrated process monitoring system in a fibre laser. The application describes how, with the addition of a photo diode based monitor over a specially designed cladding mode stripper; the back-reflected light from a material processing application can be quantified and used to evaluate the processing. The system shown in that specification is shown in FIGS. 1 and 2. This system may be used on some embodiments of the present invention, although the invention may be practised in other ways, using different apparatus.

FIG. 1 shows schematically a material processing apparatus using a fibre laser. A fibre laser 1 is used to generate a laser beam in well known manner A typical fibre laser includes means for transmitting pumping radiation (light) from one or more pumping laser diodes through the cladding of a double clad fibre, the pump light is absorbed in the doped core of the fibre, diffraction gratings are spliced to the fibre amplifier to form a resonant cavity. The laser beam emitted from the fibre laser is applied via a double clad single mode delivery fibre 2 to a processing unit 3 which generally includes optics for collimation and focusing of the laser beam. The laser beam is then focused through a lens arrangement 4 to a workpiece 5 where it is used for processing the workpiece. This processing may typically include cutting, welding, surface modification or other processing steps.

For all of these types of processes, the interaction of the light with the material varies depending on a wide range of parameters as discussed. As discussed, the back-reflected radiation from the workpiece is, in embodiments of the invention, used to control the process.

FIG. 1 includes schematically, as part of the fibre laser, an integral monitor 6 of back-reflection. Back-reflection from this integral monitor is applied to a system control and analysis device 7.

In the device of FIG. 1, the fibre laser output is delivered via a double clad single mode delivery fibre 2 which may, for instance, have a core diameter of 10 microns and a first cladding diameter of 200 μm having numerical apertures of 0.08 and 0.46 respectively. Back-reflection at the laser wavelength is caused by reflection from the surface of the workpiece that the laser output is focused onto. Back-reflections at other wavelengths can be generated by the plasma formed from interaction of the beam with the workpiece. A portion of this back-reflection is collected back into the imaging optics and transmitted back into the first cladding of the delivery fibre. This back-reflection propagates in the first cladding of the delivery fibre back into the laser.

Many different schemes may be used for extracting the back-reflected (ie feedback) radiation from the cladding of the delivery fibre and using this to monitor the material processing operations.

As shown in FIG. 1a, the single mode delivery fibre 2 comprises a core 8, a first cladding layer 9 and an outer cladding layer 10. The laser output is transmitted to the workpiece in the core 8. A significant proportion of the back-reflected light propagates in the first cladding 9 guided by the outer cladding 10 which has a lower refractive index.

In an example shown in FIG. 2, the reflected signal captured by the delivery fibre can be extracted from the 10/200 μm fibre by stripping the fibre of its outer low index coating and then potting this area in a high index material. The high index material may, for example, be Norland optical adhesive having a refractive index of 1.56. In preferred embodiments, the guided light in the multimode cladding of the delivery fibre is stripped out over a distance of a few millimeters but this may vary. The stripped light is then monitored by any convenient monitoring device. This may typically be any opto electronic device such as a photodiode.

This outer cladding is most preferably partially stripped somewhere in an unbroken length of the delivery fibre away from any splice points: this arrangement maximises the discrimination between the forward-going light emitted by the laser and the back-reflected light in the cladding. However, it may be preferable to locate the stripped section in the vicinity of a splice point for ease of construction of the laser: in this case means for discriminating between forward-going light scattered from the core at the splice point and back-reflected light in the cladding must be provided. FIG. 2 is an example of the latter, where the splice is located in the stripped region 11 of the double clad single mode delivery fibre, where the outer cladding layer 10 is stripped away. This enables the back-reflected light which was in the first cladding layer to be detected by a suitable opto electronic device and used for monitoring the process.

As mentioned above, in an embodiment where the outer cladding layer is stripped in the vicinity of a splice point, it is most preferable that discrimination is made between the forward signal arising from scatter of the splice 12 itself and the reverse cladding mode. This is because inevitably at a splice point, some of the desired laser signal travelling in the forward direction F will be scattered at the splice point and this is not the radiation that it is desired to monitor. The desired radiation will be the radiation moving in the backwards direction B.

Figure 3:
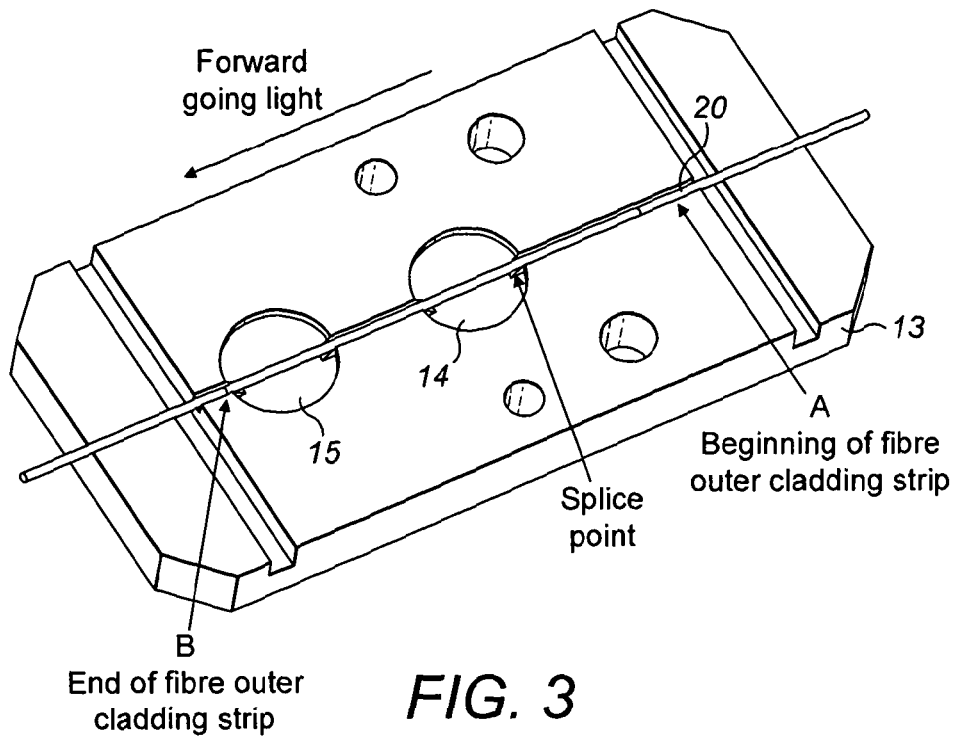
FIG. 3 shows a light stripping means.

Therefore, in embodiments of the invention in which the outer cladding is stripped around a splice point, a cladding mode stripper (CMS) is most preferably used. FIG. 3 shows one example of a CMS. This comprises a component 13 that is placed in the vicinity of the splice point and stripped portion of the fibre and which comprises two spatially displaced portals 14 and 15. It is positioned with respect to the stripped portion of the fibre so that the portal 14 overlies the splice point 12. The portion 15 lies a distance away from that (typically nearer the workpiece/beam delivery end). In a typical embodiment, the distance between the centres of the portal is around 13 mm and the radius of each portal is around 7 mm. The fibre is potted within this component. The portals are generally circular in the embodiment shown. They may be elliptical, or any other shape.

The device 13 has a longitudinal groove 20 into which the optical delivery fibre, including the stripped portion, is located (potted). The stripped portion of the fibre has between A and B in the figure, with portal 14 overlying a splice point and portal 15 spaced apart from this.

A light detector, such as one or more photodiodes or other opto electronic means, is arranged to detect light contained by the portal 15 which is spaced from the splice.

The portal 14 serves to contain any light which is scattered at the splice position itself (which will be mainly laser radiation and not the back-reflection which it is intended to monitor) and this is therefore isolated from the monitor point.

Other means of spatially isolating the desired from the undesired radiation in the vicinity of the stripped portion of the fibre may be used. Effectively, any means which spatially isolates the scatter from forward going and reverse radiation may be used. Typically, this may result in a greater sensitivity for the monitor photodiode of at least 10:1.

In embodiments of the invention, a target material (herein known as a workpiece although it may of course be just a sample target to set up focus, or any other target, or a piece of material which is specifically desired to be worked on) is placed within the focus region. The target material is preferably of a stainless steel, although it may be of other material. For a gas assisted cutting head, the nozzle height relative to the workpiece can be set so that the focus found is set relative to the gas tip.

As shown in FIG. 1, the fibre laser is arranged to transmit fibre pulses via the processing unit 3 and lens 4 to the workpiece 6 and is spaced such that the focus lens to workpiece distance F can be varied in axial direction Z (or having a component in direction Z). This can be by moving the focus lens, and/or by moving the workpiece. The term 'output' is used in the specification to imply the part at which laser radiation from the fibre is launched into free space before it impinges upon the workpiece. Thus, in the embodiment shown in FIG. 1 this will be where it leaves the focus lens 4 on its way to the workpiece 5.

Figure 4A:
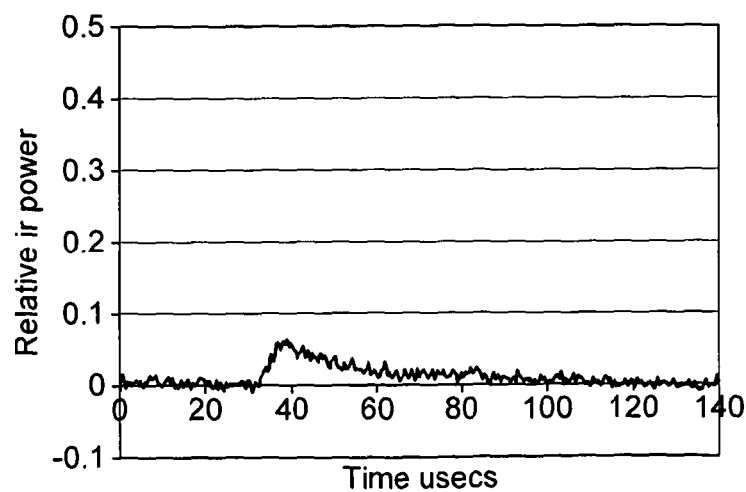
Figure 4B:
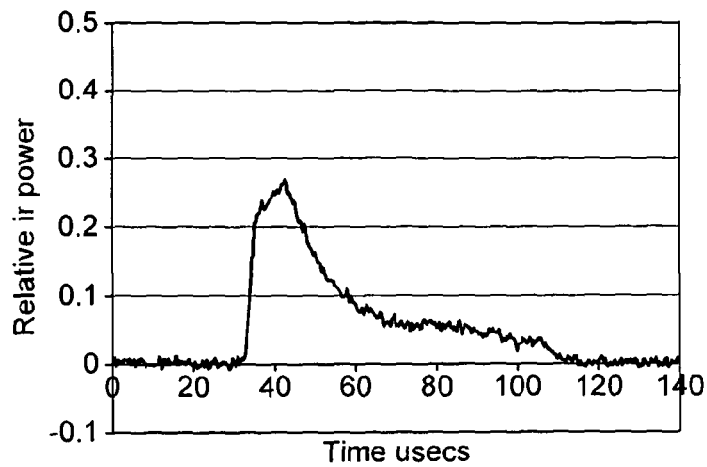
Figure 4C:
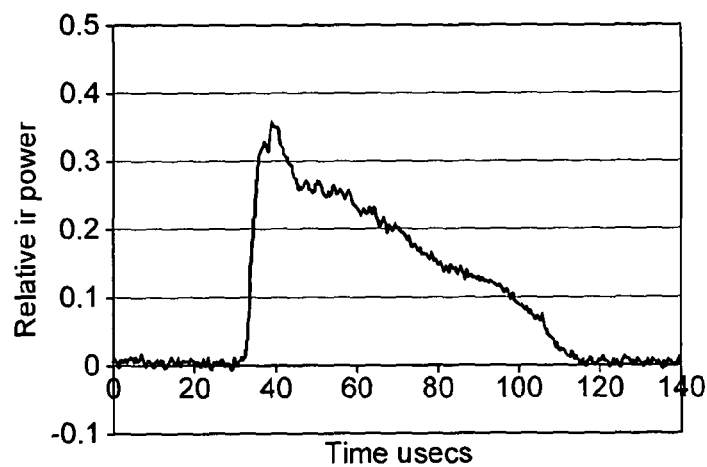
Figure 4D:
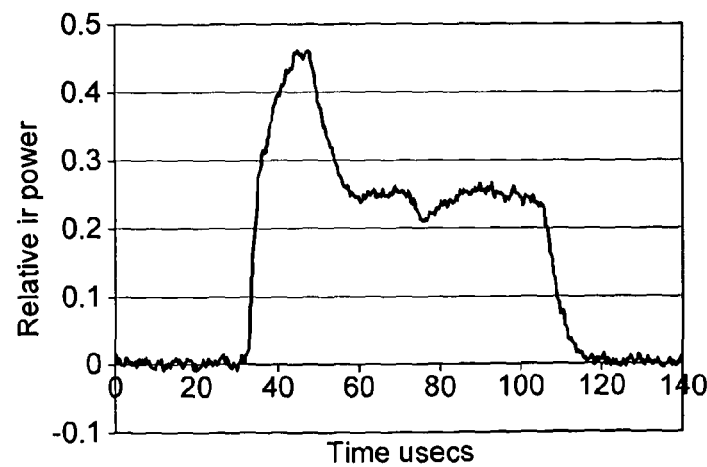

FIGS. 4(a) to 4(d) show typical values of back-reflected radiation from a pulsed laser output. In this case, the fibre laser is arranged to produce 100 μs 50 W peak square pulses. The IR back-reflection from this pulse is measured over a period of time (140 μs shown in each figure) and the back-reflection measured is the infrared component. FIG. 4(a) shows the result when the workpiece is 0.1 mm out of focus. That is, the workpiece is positioned 0.1 mm away from the focus position of the lens 4. FIG. 4(b) shows a resulting waveform when the workpiece is 0.2 mm out of focus, FIG. 4(c) when it is 0.3 mm out of focus and FIG. 4(d) when it is 0.4 mm out of focus.

It is seen that as the target is moved increasingly out of focus there is an increasing amount of infrared (IR) back-reflected light. The form of the wave forms is governed by the time for the volume of material heated by the laser to reach boiling point. Before this phase change in the material, the metallic surface (which, it will be recalled will generally be stainless steel or other metallic or reflective surface) is reflective to the incident light. When the beam is out of focus, a larger volume is heated and it therefore takes longer for the boiling point to be reached. Thus, a greater of amount of back-reflection is seen. When in focus, the back-reflected signal is practically zero indicating that the radiation couples into the material almost immediately, resulting in no back-reflection. A portion of this back-reflected IR light is collected by the delivery fibre and dumped and detected by the photo diode/cladding mode stripper combination.

FIG. 5 shows a flow chart illustrating steps used in an exemplary method using the apparatus of FIGS. 1 to 3. The workpiece is relatively positioned a first distance X from the focus lens. This step is not specifically shown in figure. The laser is then begun to be operated to generate laser energy, preferably pulsed laser energy. In one particular embodiment, it generates 100 μs 50 W peak square pulses at step 51. The back-reflected IR, or part of it, is captured by the CMS (cladding mode stripper), eg that of FIG. 5, or other means for removing radiation. The captured light is measured and the back-reflected waveform is integrated by software within the fibre laser 1 at step 52. Thus, a series of samples as shown in FIG. 4(a), 4(b) and so on is generated and the integral of these is calculated to generate a single number. These values are recorded together with the distance F in the Z direction and the integral at step 53. The workpiece is then moved in the Z direction either towards or away from the focus lens 4. Note that in alternative embodiments, the processing unit end lens may be moved instead of the workpiece, or both may be moved relative to one another. For each new focus position F, a fresh area of the target is chosen by moving the workpiece in X or Y direction 54. A further pulse is then generated at 51 and a new back-reflected signal, at the different distance, is detected and a new integral measured.

By continually looping through a range of distances a number of values of the integral can be measured and these values are plotted at step 56. Examples of this resulting plot are shown in FIG. 6. The plot show the integrated value of the back-reflected signal against the distance of the focus lens relative to the target. A parabola of this type is typical when the back-reflected signal is plotted against the focus position. A first plot 61 is a reference plot and that the second plot 62 shows a plot where the lens is displaced by 100 μm., illustrating how the vertex of the parabola is shifted by this focal length change. By finding the null of the curve the focus can be found to within the confocal parameter of the beam. Finding the vertex of the parabola achieves the highest accuracy for the position of the focus with a precision much smaller than the confocal parameter of the beam FIG. 7 shows a similar plot for different focal length lenses. In this case, plot 71 shows a 100 mm focal length lens and plot 62 shows a 160 mm focal length lens. Again, minima are achieved for both and thus the precise focal length can be easily established for precise positioning. The parameters for three beams are shown:

| Lens | Spot size | Confocal parameter |
| --- | --- | --- |
| 76 | 10 | 160 |
| 100 | 14 | 308 |
| 160 | 22 | 760 |

In embodiments of the invention, the focal position can be found to within the confocal parameter of the beam itself. Note that there is a greater proportion of back-reflected light deposited in the CMS port when the lens to workpiece distance is greater than the focal length of the lens than when it is shorter. This is seen in both FIGS. 6 and 7 where there is asymmetry between the right and left hand sides of the focal point at 0 mm. This asymmetry can be used to give directionality to the focus finding operation.

For optimum sensitivity the choice of the probe pulse energy may be of importance in some embodiments. The energy should be chosen so as to enable boiling point to be reached on the target. This resulting phase change results in near 100% absorption of the laser light and zero reflection at optimum focus. If the peak power of the laser is set too high than the phase change will occur rapidly over a wide range of focal positions, which may desensitize the method. Conversely, too low a peak power will result in either no phase change (ie no boiling) at all or one that is extremely sensitive to focal positions, in which case the dynamic range for the method might be impaired, although the method would not be completely useless. As an example, for stainless steel targets with a focus spot size of less than 100 μm, the optimum pulse energy is found to be in the range of 5 to 50 mJ with a pulse duration in the range of 100 to 500 μs. The optimum pulse energy for other types of target will be able to be determined by the skilled man by calculation or trial and error.

Alternative methods of analysing the back-reflected signal can be used. For instance the amplitude of the back-reflected signal can be minimised to find focus In alternative embodiments, only a portion of the pulses are used. For example, a portion of the signal, eg a certain number n of microseconds worth, at the beginning, end or intermediate part of pulses of FIG. 4(a) might be used. 'n' might be 10, or any other number.

A further application of this invention is to use it as a tool to map out the contour profile of a workpiece prior to processing.

In a modification, the device is used to actively control the focus lens to workpiece height F by minimising the error signal. In this case, a feedback loop is included from the processing part of the laser 1 to a means for moving the workpiece 5 in the said direction and this is shown schematically by dashed lines 70 in FIG. 1. Alternatively, of course the lens can be moved. A feedback loop may also include means for detecting the visible light back-reflected as well as the IR light to improve accuracy and flexibility for material processing applications. WO 2009/112815 shows how a CMS can be modified to detect visible, as well as IR back-reflection.

The $M^2$ factor, also called beam quality factor or beam propagation factor, is a common measure of the beam quality of a laser beam. According to ISO Standard 11146 [4], it is defined as the beam parameter product divided by $\lambda/\pi$, the latter being the beam parameter product for a diffraction-limited Gaussian beam with the same wavelength. In other words, the half-angle beam divergence is $$\theta = M2\frac{\lambda}{\pi w}$$

where $W_0$ is the beam radius at the beam waist and $\lambda$ the wavelength. A laser beam is often said to be "$M^2$ time diffraction-limited". A diffraction-limited beam has an $M^2$ factor of 1, and is a Gaussian beam. Smaller values of $M^2$ are physically not possible.
The confocal parameter of a Gaussianbeam is given by $Z=piXw_0^2/(M^2 \times lambda)$
This corresponds to the point that a beam will have expanded by a factor of the SQR 2.

The M2 factor of a laser beam limits the degree to which the beam can be focused for a given beam divergence angle, which is often limited by the numerical aperture of the focusing lens. Together with the optical power, the beam quality factor determines the brightness of a laser beam.

Embodiments provide simplicity, cost and is integral to the fibre laser itself requiring no additional optics around the beam delivery/workpiece area. Additional components around the delivery area are not required reducing complexity, cost and the possibility of a hostile environment for the optics. Integrating into the fibre laser means that all lasers come with the capability to locate focus irrespective of how the laser beam is being delivered.

The embodiments above use methods of locating the focus position of a fibre using light that is back reflected off a workpiece and transmitted in the cladding of the delivery fibre. It has been found that for high average power lasers (typically of about 500 W or more, although this is not limiting) the focal position and quality can change with time due to absorption of the laser radiation by delivery optics, resulting in a thermal lens effect in the lenses. Consequently, there can be a significant shift in the focal position of the focus spot over, typically, a time period of the order of seconds or tens of seconds. This effect will complicate the focus optimisation for any user; the end user may set the focus when cold but experience a drift in focus which may cause a deterioration in the process.

FIGS. 8 to 11 show a method of tracking change in focal position to allow a user to quantify the temporal shift in focus and to compensate for it.

FIG. 8 shows an example of a waveform that may be used. The waveform comprises pulses of full power 60, typically of pulse duration 1 msec of more. Between these pulses are transmitted very short test pulses 61, typically of 50 or 100 µs as shown. The effects of the test pulses on a workpiece are shown on a workpiece which is moved relative to the laser are shown at 62 and the effects on the workpiece of the full power pulse are shown schematically at 63.

The workpiece is moved relative to the pulsing focus laser to act as a target to measure. One particular algorithm, described as an example only, is as follows.
A. The focus is scanned across the workpiece by either moving the workpiece or the laser beam (or both).
B. The waveform shown in FIG. 8 is used. This comprises very short eg 50 µs test pulses to measure feedback level, hence quality of focus, and relatively long pulses of, for example, at least msec duration at full power which act to heat the lens or lenses of the optical system up. The time period of the test pulse is much shorter than the long higher power pulse. Therefore, effectively thermally the optical system experiences a load very close to if it was on at full power from the time elapsed from start up.
C. The feedback at each test pulse is measured and this effectively measures the position of focus.
D. The process is continued for the estimated thermal time constant of the optical system, which will be understood by those skilled in the art and which typically is a few seconds.

FIG. 9 shows a typical back reflected signal with focus position. Reference is made to, for example, FIG. 6 for an explanation. The test of FIG. 8 can be run at anywhere along the curve 64 of FIG. 9. If the scan is conducted at point A then a null would be produced if there is no significant problem with the thermal effects of the optic.

Running at point B, for example, gives greater sensitivity since the mean error of the signal is on a slope so that the direction of the focus shift will also be indicated. The choice of point at which the scan is done is most ideally at a point of greatest slope, such as at point B, but should not in general be too far from the focus point as this might cause damage to a laser.

FIG. 10 shows schematic test results of a system with good thermal performance of the optical system in which there is no change in error and therefore no change in focus. The error signal is generally constant. FIG. 10 shows a system of poor thermal performance where the focus tends to shift with time and this is indicated by a change in error 66 with time.

The invention claimed is:
1. A method of optimising the focus of a fibre laser, comprising positioning the output of a fibre laser relative to a workpiece; generating pulses of laser radiation; measuring at least a portion of a waveform of back reflected radiation from the workpiece resulting from the pulses; changing the relative position of the output and the workpiece a plurality of times; generating pulses of laser radiation and measuring at least a portion of a waveform of back reflected radiation from the workpiece resulting from the pulses each time; and analysing, by a processor, the resulting measured back-reflected radiation to determine optimum focus,
wherein the power of the pulses is selected so that a phase change occurs at the workpiece and wherein the analysing the resulting measured back-reflected radiation comprises determining integrals of the back reflected radiation at each relative position and using the integrals to determine optimum focus by determining a minimum value of the integrals.

2. A method according to claim 1, comprising generating pulses of laser radiation and integrating a back-reflected waveform, or part thereof, resulting from each or a selection of pulses to generate a plurality of single integral values.

3. A method according to claim 1, including the step of using optimum focus to actively control the distance of the output from the workpiece.

4. A method according to claim 1, wherein the back-reflected radiation is transmitted in a cladding layer of the delivery fibre, and removed from the cladding layer.

5. A method according to claim 1, wherein the duration of the pulses is selected so that boiling occurs at the workpiece.

6. A method as claimed in claim 5, wherein the workpiece is of stainless steel, pulse energy is in the range of 5 to 50 mJ and pulse duration is in the range of 100 to 500 µs.

7. Material processing apparatus, comprising a fibre laser having an output which generates pulses of laser radiation from the laser onto a workpiece, the output and workpiece being moveable relative to each other; a monitoring unit coupled to a first end of the fibre laser and configured to monitor at least part of a waveform of the back reflection resulting from the pulses; an analyzing unit coupled to the monitoring unit, the analyzing unit configured to analyze the back-reflection at each of a selection of relative positions of the output and workpiece; and a focusing unit coupled to a second end of the fibre laser, the focusing unit configured to use the analysis to determine optimum focus, wherein the power of the pulses is selected so that a phase change occurs at the workpiece and wherein the analysis to determine optimum focus comprises determining integrals of the back reflected radiation at each relative position and using the integrals to determine optimum focus by determining a minimum value of the integrals.

8. Apparatus according to claim 7, wherein the apparatus is adapted to monitor back-reflection in the infrared region.

9. Apparatus according to claim 7, wherein the fibre laser is arranged to generate pulses and a waveform of back-reflection is determined from one or more pulses at each relative position of the output and workpiece, each detected back-reflection waveform being integrated and the integrals being analysed to determine optimum focus.

10. Apparatus according to claim 7, wherein the monitoring unit is additionally or alternatively configured to monitor back-reflected visible radiation.

11. Apparatus according to claim 7, including a cladding mode stripper.

12. Apparatus according to claim 7, wherein the analyzing unit is configured to plot the back-reflection and/or the integral result in graphical format.

13. The apparatus of claim 7, the apparatus further configured and adapted to measure changes in focal position at different points in time.

14. A method of measuring changes in focus of a fibre laser, comprising generating test pulses, moving a test piece relative to the output of the fibre laser, measuring at least a portion of back reflected radiation from the test pulses and analysing, by a processor, the measured back reflected radiation to determine changes in focus, wherein the power of test pulses is selected so that a phase change occurs at the workpiece and wherein the analysing the measured back-reflected radiation comprises determining integrals of the back reflected radiation at each relative position and using the integrals to determine optimum focus by determining a minimum value of the integrals.

15. A method according to claim 14, comprising generating a waveform comprising pulses of full power interspersed by one or more relatively short duration test pulses and measuring feedback from the test pulses to detect changes in focus.

16. A method according to claim 14, wherein the test pulses are of duration of about 50 µs.

* * * * *